United States Patent
Shaw et al.

(10) Patent No.: US 12,378,344 B2
(45) Date of Patent: Aug. 5, 2025

(54) POLYMER LATEX COMPOSITION FOR THE PREPARATION OF AN ELASTOMERIC FILM HAVING SELF-HEALING PROPERTIES

(71) Applicant: Synthomer Sdn. Bhd., Johor Darul Takzim (MY)

(72) Inventors: Peter Shaw, Harlow (GB); Zhenli Wei, Johor Darul Takzim (MY); Yi-Fan Goh, Johor Darul Takzim (MY)

(73) Assignee: Synthomer Sdn. Bhd., Johor Darul Takzim (MY)

( * ) Notice: Subject to any disclaimer, the term of this patent is extended or adjusted under 35 U.S.C. 154(b) by 749 days.

(21) Appl. No.: 17/633,428

(22) PCT Filed: Aug. 9, 2019

(86) PCT No.: PCT/MY2019/000034
§ 371 (c)(1),
(2) Date: Feb. 7, 2022

(87) PCT Pub. No.: WO2021/029763
PCT Pub. Date: Feb. 18, 2021

(65) Prior Publication Data
US 2022/0282015 A1   Sep. 8, 2022

(51) Int. Cl.
| | | |
|---|---|---|
| C08L 13/02 | (2006.01) |
| C08C 1/00 | (2006.01) |
| C08C 1/15 | (2006.01) |
| C08C 19/22 | (2006.01) |
| C08C 19/25 | (2006.01) |
| C08C 19/36 | (2006.01) |
| C08F 2/24 | (2006.01) |
| C08F 236/10 | (2006.01) |
| C08F 236/12 | (2006.01) |
| C08J 3/24 | (2006.01) |
| C08J 5/18 | (2006.01) |

(52) U.S. Cl.
CPC .............. *C08F 236/10* (2013.01); *C08C 1/15* (2013.01); *C08C 19/22* (2013.01); *C08C 19/25* (2013.01); *C08C 19/36* (2013.01); *C08F 2/24* (2013.01); *C08F 236/12* (2013.01); *C08J 3/24* (2013.01); *C08J 5/18* (2013.01); *C08L 13/02* (2013.01); *C08F 2810/20* (2013.01); *C08L 2312/00* (2013.01)

(58) Field of Classification Search
CPC ...... C08L 13/00; C08L 13/02; C08L 2312/00; C08L 2312/08; C08F 236/12; C08F 2810/20; C08C 19/36; C08C 19/30; C08C 19/25; C08C 19/22; A41D 19/0055
See application file for complete search history.

(56) References Cited

U.S. PATENT DOCUMENTS

| | | | |
|---|---|---|---|
| 5,750,618 A | 5/1998 | Vogt et al. |
| 10,717,851 B2 | 7/2020 | Kim et al. |
| 11,697,717 B2 | 7/2023 | Holzner et al. |
| 2016/0186000 A1 | 6/2016 | Yang et al. |
| 2018/0194924 A1 | 7/2018 | Mosaki |
| 2018/0282492 A1* | 10/2018 | Fukumine ................ C08K 3/36 |

(Continued)

FOREIGN PATENT DOCUMENTS

| | | |
|---|---|---|
| CN | 105837773 A | 8/2016 |
| CN | 109071885 A | 12/2018 |
| EP | 0792891 A1 | 9/1997 |

(Continued)

OTHER PUBLICATIONS

WO 2017/126660 A1 (Jul. 27, 2017); machine translation. (Year: 2017).*

(Continued)

*Primary Examiner* — Rip A Lee
(74) *Attorney, Agent, or Firm* — Buchanan Ingersoll & Rooney PC

(57) ABSTRACT

An aqueous polymer latex composition is described for the preparation of an elastomeric film comprising:

(I) particles of a latex polymer obtained by free-radical emulsion polymerization of a mixture of ethylenically unsaturated monomers, the particles bearing functional groups (a); and (II) a cross-linking component selected from monomeric compounds and oligomeric or polymeric compounds that are not prepared be free-radical addition polymerization, the cross-linking component comprising functional groups (b) and (c) that are different from each other, wherein functional group (b) forms upon reaction with functional group (a) a thermally reversible linkage selected from one or more of (i) a linkage having the structural formula

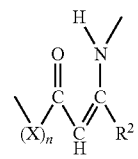

wherein X, n, R1 and R2 are as defined; and
(ii) a beta-hydroxy ester linkage; and functional groups (c) on different molecules of component (II) are capable of reacting with each other to provide elastomeric films having self-healing properties that can be repaired and recycled.

19 Claims, 5 Drawing Sheets

(56) References Cited

U.S. PATENT DOCUMENTS

2019/0085157 A1 3/2019 Kim et al.

FOREIGN PATENT DOCUMENTS

| JP | 2005187544 A | 7/2005 | |
|---|---|---|---|
| JP | 2005200559 A | 7/2005 | |
| JP | 2008512526 A | 4/2008 | |
| JP | 2019510854 A | 4/2019 | |
| JP | 2019512572 A | 5/2019 | |
| WO | 2006027164 A1 | 3/2006 | |
| WO | 2011068394 A1 | 6/2011 | |
| WO | 2017010370 A1 | 1/2017 | |
| WO | WO 2017/126660 A1 * | 7/2017 | ............... C08L 9/04 |
| WO | 2017164726 A1 | 9/2017 | |
| WO | 2017209596 A1 | 12/2017 | |

OTHER PUBLICATIONS

Denissen, W.; Rivero, G.; Nicolay, R.; Leibler, L.; Winne, J.M.; Du Prez, F.E. Advance Functional Materials 2015, 25, 2451-2457. (Year: 2015).*

Liu et al., "Engineering of β-Hydroxyl Esters into Elastomer-Nanoparticle Interface Toward Malleable, Robust, and Reprocessable Vitrimer Composites", Applied Materials & Interfaces, 2018, vol. 10, pp. 2992-3001.

Liu et al., "Tailoring Vinylogous Urethane Chemistry for the Cross-Lined Polybutadiene: Wide Freedom Design, Multiple Recycling Methods, Good Shape Memory Behavior", Polymer, 2018, vol. 148, pp. 202-210.

International Search Report and Written Opinion for International Application PCT/MY2019/000034, dated May 26, 2020, 9 pages.

XP002798055, Database WPI, Week 201680, Thomson Scientific, London, GB, AN 2016-520805, dated Apr. 15, 2016, 2 pages.

Fortman et al., "Approaches to sustainable and continually recyclable cross-linked polymers", ACS Sustainable Chem. Eng., (Aug. 26, 2018), vol. 6, pp. 11145-11159.

Indian Examination Report issued Aug. 22, 2024, by the Intellectual Property Office of India in corresponding Indian Application No. 202237003535 and an English translation. (6 pages).

Office Action (The Second Office Action) issued Feb. 28, 2024, by the State Intellectual Property Office of People's Republic of China in corresponding Chinese Patent Application No. 201980099158.X and an English translation. (28 pages).

Office Action issued Jan. 30, 2024, by the Taiwan Patent Office in corresponding Taiwanese Patent Application No. 109122910 and an English translation. (11 pages).

* cited by examiner

POLYMER LATEX COMPOSITION FOR THE PREPARATION OF AN ELASTOMERIC FILM HAVING SELF-HEALING PROPERTIES

CROSS-REFERENCE TO RELATED APPLICATIONS

This application is a National Phase application of International Application No. PCT/MY2019/000034, filed 9 Aug. 2019, the entire disclosure of which is incorporated herein by reference for all purposes.

FIELD OF THE INVENTION

The present invention relates to an aqueous polymer latex composition for the preparation of an elastomeric film showing self-healing properties that can be repaired and/or recycled, to such elastomeric films, to compounded latex compositions comprising said polymer latex compositions, to methods for making dip-molded articles, to methods for repairing or recycling elastomeric films and in particular but not exclusively to repairing or recycling an elastomeric film using thermal re-processing.

BACKGROUND OF THE INVENTION

According to the present industry standard, elastomeric films, in particular in dip-molding applications, for example examination gloves, are made from compounds containing carboxylated acrylonitrile butadiene latices (XNBR). In order to obtain the required mechanical strength for the purpose of use of these elastomeric films, some crosslinking of the films during the manufacturing of the elastomeric films needs to be achieved.

Several different concepts are available in the prior art in order to obtain such crosslinked elastomeric films. One possibility is that the compound for making the elastomeric films contains a conventional sulfur vulcanization system such as sulfur in combination with accelerators, such as thiurams and carbamates and zinc oxide.

Since sulfur vulcanization systems might lead to allergic reactions, alternative concepts to make the latex film curable have been developed. Another possibility is to include in the compound a crosslinker component like, for example polyvalent cation, for example zinc oxide or other poly-functional organic compounds suitable to react with functional groups on the latex particles in order to achieve chemical crosslinking. Furthermore, if the polymer latex bears sufficient amounts of self-crosslinking groups, for example N-methylolamide groups, sulfur vulcanization systems and/or crosslinkers may be totally avoided.

All these different concepts lead to crosslinked elastomeric films, wherein the crosslinks are in essence irreversible so that that these elastomeric films cannot easily be recycled nor do they show any self-healing properties to make them repairable. For example, if any kind of defect such as pinholes occur during the manufacturing of the elastomeric film because of the lack of self-healing properties of the film, these products need to be scrapped, resulting in non-reusable waste. In addition, if such elastomeric films crack during their use, this cannot be repaired, resulting in an irreversible destruction of the elastomeric film and, thus, to failure of the article containing such elastomeric film.

Accordingly, there is a desire in the industry for polymer latex compositions that provide elastomeric films that have inherent self-healing properties and can potentially be recycled in order to reduce the non-usable waste of such elastomeric films and to avoid final failure of articles comprising such elastomeric films.

WO2017/209596 discloses a polymer latex for dip-molding applications comprising two different types of latex particles. One kind of latex particles is carboxylated whereas the second kind of latex particles contains oxirane-functional groups.

Thus, the present invention seeks to provide an aqueous polymer latex composition and elastomeric films made therefrom that have self-healing properties and a method for repairing or recycling said elastomeric films.

SUMMARY OF THE INVENTION

The present inventors have surprisingly found that an elastomeric film made from an aqueous polymer latex composition comprising:
(I) particles of a latex polymer obtainable by free-radical emulsion polymerization of a mixture of ethylenically unsaturated monomers said particles bearing functional groups (a), wherein the latex polymer has an average gel content of less than 70 wt.-%; and
(II) a cross-linking component selected from monomeric compounds and oligomeric or polymeric compounds that are not prepared be free-radical addition polymerization, said cross-linking component comprising functional groups (b) and (c) that are different from each other, wherein
functional group (b) forms upon reaction with functional group (a) a thermally reversible linkage selected from one or more of
(i) a linkage having the structural formula

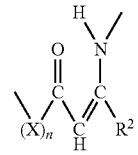

wherein X is —O— or —NR$^1$—,
n is 0 or 1,
R$^1$ is hydrogen or a hydrocarbyl group, and
R$^2$ is a hydrocarbyl group;
and
(ii) a beta-hydroxy ester linkage; and
functional groups (c) on different molecules of component (II) are capable of reacting with each other
has self-healing properties and thus can be repaired and recycled. This was not possible before with sulfur vulcanized elastomeric films known from the prior art.

According to one aspect the present invention relates to an aqueous polymer latex composition comprising:
(I) particles of a latex polymer obtainable by free-radical emulsion polymerization of a mixture of ethylenically unsaturated monomers said particles bearing functional groups (a), wherein the latex polymer has an average gel content of less than 70 wt.-%; and
(II) a cross-linking component selected from monomeric compounds and oligomeric or polymeric compounds that are not prepared be free-radical addition polymerization, said cross-linking component comprising functional groups (b) and (c) that are different from each other, wherein functional group (b) forms upon reaction with functional group (a) a thermally reversible linkage selected from one or more of
(i) a linkage having the structural formula

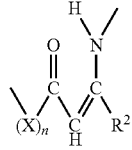

wherein X is —O— or —NR$^1$—,
n is 0 or 1,
R$^1$ is hydrogen or a hydrocarbyl group, and
R$^2$ is a hydrocarbyl group;
and
(ii) a beta-hydroxy ester linkage; and
functional groups (c) on different molecules of component (II) are capable of reacting with each other.

According to a further aspect the present invention relates to the use of said aqueous polymer latex composition for the production of dip-molded articles or for coating or impregnating a substrate, preferably a textile substrate.

According to a further aspect the present invention relates to a compounded latex composition suitable for the production of dip-molded articles comprising the aqueous polymer latex composition as defined above and optionally adjuvants selected from sulfur vulcanization agents, accelerators for sulfur vulcanization, crosslinkers, polyvalent cations and combinations thereof.

According to a further aspect the present invention relates to a method for making dip-molded articles by
a) providing a compounded latex composition as defined above;
b) immersing a mold having the desired shape of the final article in a coagulant bath comprising a solution of a metal salt;
c) removing the mold from the coagulant bath and optionally drying the mold;
d) immersing the mold as treated in step b) and c) in the compounded latex composition of step a);
e) coagulating a latex film on the surface of the mold;
f) removing the latex-coated mold from the compounded latex composition and optionally immersing the latex-coated mold in a water bath;
g) optionally drying the latex-coated mold;
h) heat treating the latex-coated mold obtained from step e) or f) at a temperature of 40° C. to 180° C., preferably 60° C. to 100° C.; and
i) removing the latex article from the mold.

Still a further aspect of the present invention relates to an elastomeric film made from the aqueous polymer latex composition or the compounded latex composition of the present invention, exhibiting a heterogenous phase system having at least two distinct phases wherein a first phase is formed from the latex particles (I) and a second phase is formed from the cross-linking component (II) by reaction of multiple functional groups (c) on different molecules of cross-linking component (II) with each other and the first and the second phase are linked to each other by the thermally reversible linkage as defined above and to an article comprising said elastomeric film, being selected from surgical gloves, examination gloves, condoms, catheters, industrial gloves, textile-supported gloves and household gloves.

According to a further aspect the present invention relates to a method for repairing an elastomeric film or an article comprising said elastomeric film by
a) providing a damaged elastomeric film or article comprising a damaged elastomeric film of the present invention, the damaged elastomeric film having at least surfaces to be reconnected,
b) re-joining the surfaces of the damaged film, and
c) heating or annealing the damaged elastomeric film while maintaining intimate contact of the rejoined surfaces of the damaged film at a temperature of 40° C. to 200° C.

According to a further aspect the present invention relates to a method for recycling an elastomeric film or article comprising an elastomeric film according to the present invention by cutting, shredding or comminuting said elastomeric film or article to form particles of the elastomer, optionally blending the obtained particles with particles of virgin elastomer, and forming a recycled film or article by subjecting the particles to a pressure of 1-20 MPa and a temperature of 40° C. to 200° C.

DETAILED DESCRIPTION OF THE INVENTION

Figure 1:
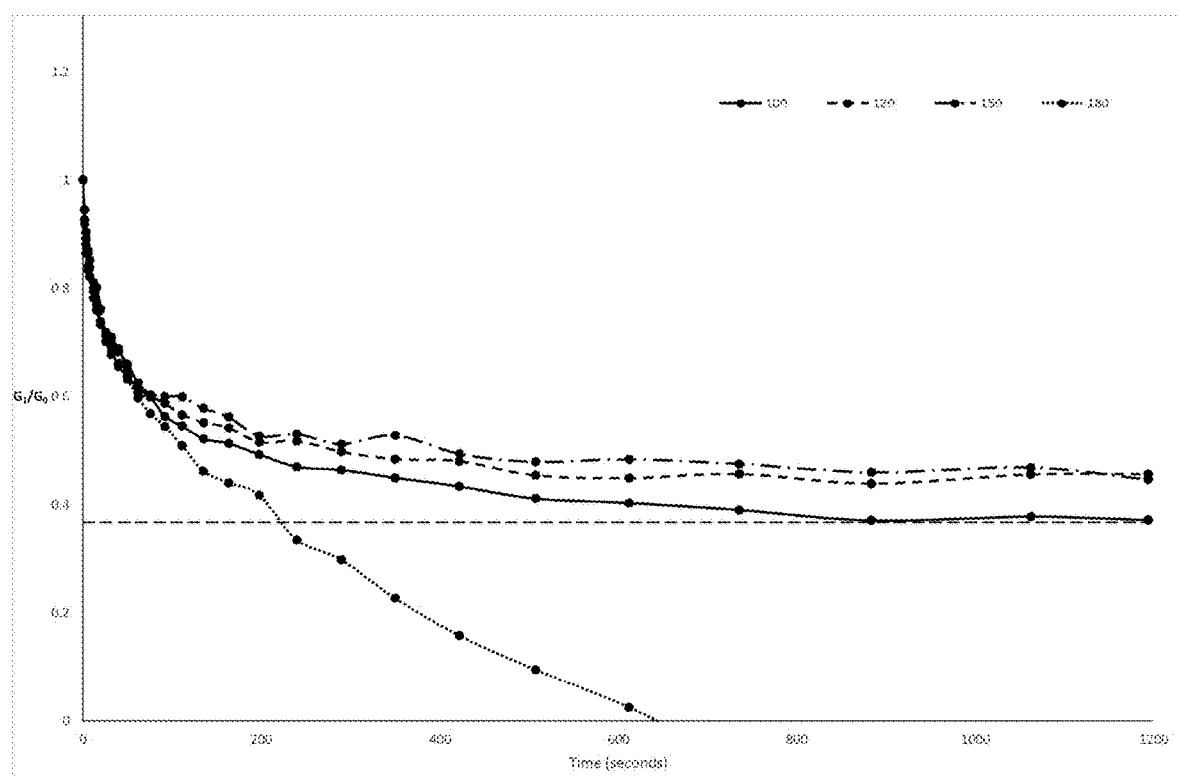
FIG. 1 illustrates the stress relaxation results of Example 4.

The polymer latex composition according to one aspect of the present invention to impart to an elastomeric film obtained therefrom self-healing properties to make said elastomeric film repairable and/or recyclable comprises:
(I) particles of a latex polymer obtainable by free-radical emulsion polymerization of a mixture of ethylenically unsaturated monomers said particles bearing functional groups (a), wherein the latex polymer has an average gel content of less than 70 wt.-%; and
(II) a cross-linking component selected from monomeric compounds and oligomeric or polymeric compounds that are not prepared be free-radical addition polymerization, said cross-linking component comprising functional groups (b) and (c) that are different from each other, wherein
functional group (b) forms upon reaction with functional group (a) a thermally reversible linkage selected from one or more of
(i) a linkage having the structural formula

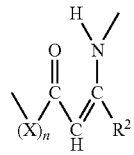

wherein X is —O— or —NR¹—,
n is 0 or 1,
R¹ is hydrogen or a hydrocarbyl group, and
R² is a hydrocarbyl group;
and
(ii) a beta-hydroxy ester linkage; and
functional groups (c) on different molecules of component (II) are capable of reacting with each other.

Latex Polymer (I)

According to the present invention the mixture of ethylenically unsaturated monomers for preparing the latex polymer (I) may comprise
a) 15 to 99 wt.-% of conjugated dienes;
b) 1 to 80 wt.-% of ethylenically unsaturated nitrile compounds;
c) 0.05 to 10 wt.-% of ethylenically unsaturated compounds bearing functional groups (a);
d) 0 to 50 wt.-% of vinyl aromatic monomers; and
e) 0 to 65 wt.-% of co-polymerizable ethylenically unsaturated compounds,
wherein monomers a) to e) are different from each other and the weight percentages being based on the total monomers in the mixture.

In the mixture of ethylenically unsaturated monomers additional ethylenically unsaturated monomers may be present, that are selected from
hydroxyalkyl esters of ethylenically unsaturated acids;
amides of ethylenically unsaturated acids;
vinyl carboxylates;
monomers having at least two ethylenically unsaturated groups;
ethylenically unsaturated silanes;
oxirane functional ethylenically unsaturated compounds; and
combinations thereof.

Conjugated diene monomers suitable for the preparation of latex polymer (I) according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene, 1,3-cyclohexadiene, myrcene, ocimene, and farnasene. 1,3-butadiene, isoprene and combinations thereof are the preferred conjugated dienes. 1,3-butadiene is the most preferred diene. Typically, the amount of conjugated diene monomer ranges from 15 to 99 wt.-%, preferably from 20 to 99 wt.-%, more preferred from 30 to 75 wt.-%, most preferred from 40 to 70 wt.-%, based on the total weight of monomers. Thus, the conjugated diene may be present in amounts of at least 15 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the conjugated diene monomers can be used in amounts of no more than 95 wt.-%, no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%. A person skilled in the art will appreciate that any range between any of the explicitly disclosed lower and upper limit is herein disclosed.

Unsaturated nitrile monomers which can be used to make the particles of latex polymer (a) include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred. These nitrile monomers can be included in amounts from 1 to 80 wt.-%, preferably from 10 to 70 wt.-%, or 1 to 60 wt.-%, and more preferred from 15 to 50 wt.-%, even more preferred from 20 to 50 wt.-%, most preferred from 23 to 43 wt.-%, based on the total weight of ethylenically unsaturated monomers for latex polymer (a).

Thus, the unsaturated nitrile may be present in amounts of at least 1 wt.-%, 5 wt.-%, at least 10 wt.-%, at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the unsaturated nitrile monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%. A person skilled in the art will appreciate that any range between any of the explicitly disclosed lower and upper limit is herein disclosed.

The ethylenically unsaturated compounds bearing functional group (a) may be selected from
ethylenically unsaturated compounds bearing a functional group having the structure:

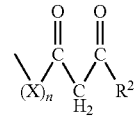

wherein X, n, R¹ and R² are defined as above, preferably selected from ethylenically unsaturated dione monomers and acetoacetoxy monomers and combinations thereof;
ethylenically unsaturated compounds having a primary amino group;
ethylenically unsaturated oxirane compounds;
ethylenically unsaturated carboxylic acids and salts thereof;
ethylenically unsaturated polycarboxylic acid anhydride, polycarboxylic acid partial ester monomers and salts thereof.

Suitable ethylenically unsaturated dione monomers may be selected from 2-(acryloyloxy)ethyl acetoacetate, 2-(methacryloyloxy)ethyl acetoacetate or vinyl acetoacetate (ethenyl 3-oxobutanoate).

Suitable ethylenically unsaturated compounds having a primary amino group may be selected from acrylamide, methacrylamide, 2-aminoethyl methacrylate and its hydro salts, N-(2-aminoethyl) methacrylamide and its hydro salts, N-(3-aminopropyl) methacrylamide and its hydro salts, allylamine and its hydro salts and methacryloyl-L-lysine and combinations thereof.

Suitable ethylenically unsaturated oxirane compounds may be selected from glycidyl (meth)acrylate, allyl glycidyl ether, vinyl glycidyl ether, vinyl cyclohexene oxide, limonene oxide, 2-ethylglycidyl acrylate, 2-ethylglycidylmethacrylate, 2-(n-propyl)glycidyl acrylate, 2-(n-propyl)glycidyl (meth)acrylate, 2-(n-butyl)glycidyl(meth)acrylate, 2-(n-butyl)glycidyl (meth)acrylate, glycidyl methyl methacrylate, glycidyl acrylate, (3',4'-epoxyheptyl)-2-ethyl acrylate, (3',4'-epoxyheptyl)-2-ethyl methacrylate, (6',7'-epoxyheptyl)acrylate, (6',7'-epoxyheptyl) methacrylate, (3-methyloxiran-2-yl)methyl 2-methacrylate, dimethyl glycidyl (meth)acrylate, 2,3-epoxybutyl(meth)acrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinyl benzyl glycidyl ether, m-vinyl benzyl glycidyl ether, p-vinyl benzyl glycidyl ether, 3-vinyl cyclohexene oxide, alpha-methyl glycidyl methacrylate, 3,4-epoxycyclohexylmethyl (meth)acrylate, and combinations thereof. Glycidyl(meth)acrylate is particularly preferred.

The ethylenically unsaturated carboxylic acids or salts thereof may be selected from monocarboxylic acid and dicarboxylic acid monomers and their anhydrides and partial esters of polycarboxylic acids. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid, cis-cyclohexene-1,2-dicarboxylic acid, dimethylmaleic acid, bromomaleic acid, 2,3-dichloromaleic acid and (2-dodecen-1-yl) succinic acid. Examples of polycarboxylic acid partial esters include monomethyl maleate, monomethyl fumarate, monoethyl maleate, monoethyl fumarate, monopropyl maleate, monopropyl fumarate, monobutyl maleate, monobutyl fumarate, mono(2-ethyl hexyl) maleate, mono (2-ethyl hexyl) fumarate. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. (Meth)acrylic acid, crotonic acid, itaconic acid, maleic acid, fumaric acid and combinations thereof are particularly preferred.

Typically, the amount of the ethylenically unsaturated compounds bearing functional groups (a) is from 0.05 to 10 wt.-%, particularly from 0.1 to 10 wt.-% or 0.05 to 7 wt.-%, preferably from 0.1 to 9 wt.-%, more preferred from 0.1 to 8 wt.-%, even more preferred from 1 to 7 wt.-%, most preferred 2 to 7 wt.-%, based on the total weight of the ethylenically unsaturated monomers for latex polymer (I). Thus, the ethylenically unsaturated compounds bearing functional groups (a); may be present in amounts of at least 0.01 wt.-%, at least 0.05 wt.-%, at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated compounds bearing functional groups (a); may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers for latex polymer (I). A person skilled in the art will appreciate that any range defined by an explicitly disclosed lower limit and an explicitly disclosed upper limit is disclosed herewith.

According to the present invention it is particularly preferred that the latex particles exhibit a gradient of the concentration of the functional group (a) with a higher concentration of functional groups (a) at the surface of the particles and a lower concentration within the bulk of the particles.

Representatives of vinyl-aromatic monomers include, for example, styrene, α-methylstyrene, vinyltoluene, o-methylstyrene, p-methylstyrene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, vinyltoluene and vinylxylene, 2-vinylpyridine, 4-vinylpyridine and 1,1-diphenylethylenes and substituted 1,1-diphenylethylenes, 1,2-diphenylethene and substituted 1,2-diphenylethylenes. Mixtures of one or more of the vinyl-aromatic compounds may also be used. The preferred monomers are styrene and α-methylstyrene. The vinyl-aromatic compounds can be used in a range of from 0 to 50 wt.-%, preferably from 0 to 40 wt.-% more preferred from 0 to 25 wt.-%, even more preferred from 0 to 15 wt.-%, and most preferred from 0 to 10 wt.-%, based on the total weight of ethylenically unsaturated monomers for latex polymer (I). Thus, the vinyl-aromatic compound can be present in an amount of no more than 35 wt.-%, no more than 30 wt.-%, no more than 25 wt.-%, no more than 20 wt.-%, no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I). Vinyl-aromatic compounds may also be completely absent.

Further, the mixture of ethylenically unsaturated monomers for latex polymer (I) according to the present invention may include additional ethylenically unsaturated monomers that are different from the above-defined monomers. These monomers may be selected from e1) alkyl esters of ethylenically unsaturated acids;
e2) hydroxyalkyl esters of ethylenically unsaturated acids;
e3) amides of ethylenically unsaturated acids;
e4) vinyl carboxylates;
e5) alkoxyalkyl esters of ethylenically unsaturated acids; and combinations thereof.

Vinyl carboxylate monomers which can be used according to the present invention include vinyl acetate, vinyl proprionate, vinyl butyrate, vinyl benzoate, vinyl-2-ethyl-hexanoate, vinyl stearate, and the vinyl esters of versatic acid. The most preferred vinyl ester monomer for use in the present invention is vinyl acetate. Typically, the vinyl ester monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

Alkyl esters of ethylenically unsaturated acids that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl(meth)acrylate and alkoxyalkyl (meth)acrylate monomers.

In general, the preferred alkyl esters of (meth)acrylic acids may be selected from $C_1$-$C_{10}$ alkyl(meth)acrylate, preferably $C_1$-$C_8$-alkyl(meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Methyl(meth)acrylate, ethyl (meth)acrylate, propyl(meth)acrylate, butyl(meth)acrylate, 2-ethylhexyl(meth)acrylate and combinations thereof are preferred.

Typically, the alkyl(meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

The hydroxyalkyl esters of ethylenically unsaturated acids which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is 2-hydroxy ethyl(meth)acrylate. Typically, hydroxy alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

Alkoxyalkyl(meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

Amides of ethylenically unsaturated acids that can be used for the preparation of the polymer latex according to the present invention include acrylamide, methacrylamide, and diacetone acrylamide. The preferred amide monomer is (meth)acrylamide. In order to introduce functional groups that are capable of self-crosslinking upon heat treatment into the polymer particles of the present invention monomers comprising N-methylol amide groups may be employed. Suitable monomers are N-methylol(meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Typically, amides of ethylenically unsaturated acid can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

The mixture of ethylenically unsaturated monomers for the latex polymer (I) may comprise:
  a) 20 to 99 wt.-% of conjugated dienes, preferably selected from butadiene, isoprene and combinations, thereof, more preferred butadiene;
  b) 1 to 60 wt.-% of monomers selected from ethylenically unsaturated nitrile compounds, preferably acrylonitrile;
  c) 0.05 to 7 wt.-% of ethylenically unsaturated acids, preferably (meth)acrylic acid;
  d) 0 to 40 wt.-% of vinyl aromatic monomers, preferably styrene;
  e1) 0 to 25 wt.-% of $C_1$ to $C_8$ alkyl(meth)acrylates;
  e3) 0 to 10 wt.-% of ethylenically unsaturated compounds bearing amide groups,
  e4) 0 to 10 wt.-% of vinyl esters:
    the weight percentages being based on the total monomers in the mixture.

According to the present invention, the amounts of the above-defined monomers for the preparation of latex polymer (a) may add up to 100 wt.-%.

According to the present invention, the mixture of ethylenically unsaturated monomers to be polymerized in the free-radical emulsion polymerization may also comprise:
  (a) 15 to 90 wt.-% of isoprene;
  (b) 1 to 80 wt.-% of acrylonitrile;
  (c) 0.01 to 10 wt.-%, preferably 0.05 to 10 wt.-% of at least one ethylenically unsaturated acid;
  (d) 0 to 40 wt.-% of at least one aromatic vinyl compound, and
  (e) 0 to 20 wt.-% of at least one further ethylenically unsaturated compound different from any of compounds (a) to (d). The ranges for component (a) and/or (b) may be selected from the ranges for (a) conjugated dienes and (b) unsaturated nitrile as disclosed above. Likewise, specific embodiments and amounts for the components (c), (d) and/or (e) may be selected from those as described above for components (c), (d) and the additional polymers.

The latex polymer (I) has a gel content of less than 70 wt.-%, preferably less than 60 wt.-%, more preferred less than 50 wt.-%, most preferred less than 40 wt.-%. The gel content as disclosed throughout the present application is measured as described in the experimental part.

Method for the Preparation of the Polymer Latex of the Present Invention:

The latex polymer (I) according to the present invention can be made by any emulsion polymerization process known to a person skilled in the art, provided that the monomer mixture as herein defined is employed. Particularly suitable is the process as described in EP-A 792 891.

In the emulsion polymerization for preparing the latex polymer (I) of the present invention a seed latex may be employed. The seed latex is preferably separately prepared and the emulsion polymerization is conducted in the presence of the separately prepared seed latex. The seed latex particles are preferably present in an amount of 0.01 to 10, preferably 1 to 5 parts by weight, based on 100 parts by weight of total ethylenically unsaturated monomers employed in the polymer latex including those for making the seed particles, such as the oxirane-functional latex particles (b). The lower limit of the amount of seed latex particles therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight. The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

The process for the preparation of the above-described latex polymer (I) can be performed at temperatures of from 0 to 130° C., preferably of from 0 to 100° C., particularly preferably of from 5 to 70° C., very particularly preferably of from 5 to 60° C., in the presence of no or one or more emulsifiers, no or one or more colloids and one or more initiators. The temperature includes all values and sub-values therebetween, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid) and inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators.

The initiator is used in a sufficient amount to initiate the polymerization reaction at a desired rate. In general, an amount of initiator of from 0.01 to 5, preferably of from 0.1 to 4%, by weight, based on the weight of the total polymer, is sufficient. The amount of initiator is most preferably of from 0.01 to 2% by weight, based on the total weight of the polymer. The amount of initiator includes all values and sub-values therebetween, especially including 0.01, 0.1, 0.5, 1, 1.5, 2, 2.5, 3, 4 and 4.5% by weight, based on the total weight of the polymer.

The above-mentioned inorganic and organic peroxy compounds may also be used alone or in combination with one or more suitable reducing agents, as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. More preferred is the use of a proprietary sodium salt of an organic sulfinic acid derivative, such as Bruggolite® FF6 or Bruggolite® FF6M. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, Sodium alkyl esters of sulfonic acid, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, wt.-%, based on the total weight of the monomers. The amount of surfactant includes all values and sub-values there between, especially including 0, 0.1, 0.5, 1, 2, 3, 4, 5, 6, 7, 8, 9, 10, 11, 12, 13, 14, 15, 16, 17, 18 and 19 wt.-%, based on the total weight of the monomer. According to one embodiment of the present invention, the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polysaccharides, and degraded polysaccharides, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2 parts by weight, based on the total weight of the monomers. The amount of protective colloids includes all values and sub-values therebetween, especially including 1, 2, 3, 4, 5, 6, 7, 8 and 9 wt.-%, based on the total weight of the monomers.

The person skilled in the art will appreciate the type and amounts of monomers bearing polar functional groups, surfactants and protective colloids that are to be selected to make the polymer latex according to the present invention suitable for dip-molding applications. Thus, it is preferred that the polymer latex composition of the present invention has a certain maximum electrolyte stability determined as critical coagulation concentration of less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.).

If the electrolyte stability is too high, then it will be difficult to coagulate the polymer latex in a dip-molding process, with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability, the adjustment is best made by trial and error experiments. But this can be easily done without any inappropriate effort using the test method for electrolyte stability, as disclosed above.

It is frequently advisable to perform the emulsion polymerization additionally in the presence of buffer substances and chelating agents. Suitable substances are, for example, alkali metal carbonates and hydrogen carbonates, alkali metal phosphates and pyrophosphates (buffer substances) and the alkali metal salts of ethylenediaminetetraacetic acid (EDTA) or hydroxyl-2-ethylenediaminetriacetic acid (HEEDTA) as chelating agents. The quantity of buffer substances and chelating agents is usually 0.001-1.0 wt.-%, based on the total quantity of monomers.

Furthermore, it may be advantageous to use chain transfer agents (regulators) in emulsion polymerization. Typical agents are, for example, organic sulfur compounds, such as thioesters, 2-mercaptoethanol, 3-mercaptopropionic acid and $C_1$-$C_{12}$ alkyl mercaptans, n-dodecylmercaptan and t-dodecylmercaptan being preferred. The quantity of chain transfer agents, if present, is usually 0.05-3.0 wt.-%, preferably 0.2-2.0 wt.-%, based on the total weight of the used monomers.

Furthermore, it can be beneficial to introduce partial neutralization to the polymerization process. A person skilled in the art will appreciate that by appropriate selections of this parameter the necessary control can be achieved.

Cross-Linking Component (II)

According to the present invention the cross-linking component (II) is selected from monomeric compounds and oligomeric or polymeric compounds that are not prepared be free-radical addition polymerization. Suitable oligomeric or polymeric compounds may be selected from polyethers, polyesters, and polyurethanes. Preferably, the cross-linking component (II) is selected from monomeric compounds and polyether oligomers. It is particularly preferred to select monomeric compounds for the cross-linking component (II).

The cross-linking component (II) comprises functional groups (b) and (c) that are different from each other. The functional group (b) forms upon reaction with functional group (a) on latex polymer (I) a thermally reversible linkage selected from one or more of (i) a linkage having the structural formula

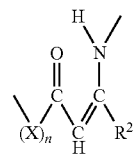

wherein X is —O— or —NR$^1$—,
n is 0 or 1,
R$^1$ is hydrogen or a hydrocarbyl group, and
R$^2$ is a hydrocarbyl group; and
(ii) a beta-hydroxy ester linkage.

A person skilled in the art will appreciate that the functional group (a) in latex polymer (I) and functional group (b) on the cross-linking component need to be appropriately selected to provide the above defined thermally reversable linkage when latex polymer (I) and the cross-linking component react with each other upon forming an elastomeric film.

According to the present invention the function group (b) may be selected from an oxirane group, a carboxylic acid group, salt or anhydride thereof, a primary amine group and a functional group having the structure:

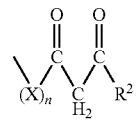

wherein X, n, R$^1$ and R$^2$ are defined as above.

According to the present invention it is preferred that the functional group (a) is a carboxylic acid group, a salt or anhydride thereof and functional group (b) is an oxirane group.

In addition, functional groups (c) on different molecules of component (II) are capable of reacting with each other. Suitable functional group (c) may be selected from silane groups bearing a plurality of silicon bonded hydroxyl groups and/or hydrolysable groups, preferably selected from alkoxy groups, oximo groups, acyloxy groups, aminooxy groups, and phosphate groups.

Suitable crosslinking components (II) may be selected from
  oxirane functional di- or tri alkoxysilanes, preferably from (3-glycidoxypropyl)trialkoxysilanes;
  primary amino functional di- or tri alkoxysilanes, preferably from (3-aminopropyl)trialkoxysilanes;

Aqueous Polymer Latex Composition:

The aqueous polymer latex composition of the present invention can be prepared by first making the polymer latex comprising the latex polymer (I) as described above and then combining the obtained polymer latex with the cross-linking component (II). In the aqueous polymer latex composition of the present invention the latex polymer (I) and the cross-linking component (II) may be present in relative amounts to provide a molar ratio of functional groups (b) to functional group (a) from 0.1 to 2, preferably from 0.1 to 1.5, more preferred from 0.2 to 0.9, most preferred from 0.3 to 0.6.

Various other additives and ingredients can be added in order to prepare the latex composition of the present invention. Such additives include, for example: antifoams, wetting agents, thickeners, plasticizers, fillers, pigments, dispersants, optical brighteners, antioxidants, biocides and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Titanium dioxide ($TiO_2$), calcium carbonate and clay are the fillers typically used.

Compounded Latex Composition for the Production of Dip-Molded Articles:

The aqueous polymer latex composition of the present invention is particularly suitable for dip-molding processes. Therefore, the polymer latex composition is compounded to produce a curable polymer latex compound composition that can be directly used in dip-molding processes. To get reproducible good physical film properties, it is advisable to adjust the pH of the compounded polymer latex composition by pH modifiers to be in the range of pH 7 to 13, preferably 10.5 to 13, more preferred 11 to 12, for dipping to produce thin disposable gloves. For producing unsupported and/or supported reusable gloves, it is advisable to adjust the pH of the compounded polymer latex composition by pH modifiers to be in the range of pH 8 to 10, preferably 8.5 to 9.5. The compounded polymer latex composition contains the polymer latex of the present invention, optionally the pH modifiers, preferably ammonia or alkali hydroxides and optionally usual additives to be used in these compositions selected from antioxidants, pigments, $TiO_2$, fillers and dispersing agents.

Alternatively, instead of compounding the polymer latex of the present invention also a polymer latex comprising the latex polymer (I) as defined above may be compounded in the same way as described above and during or after the compounding step a cross-linking component (II) as defined above is added to provide the compounded latex composition of the present invention. Of course, all variations with respect to the latex polymer (I), cross-linking component (II) and their relative amounts based on the total amount of latex polymer as described above can be used.

But it is a particular advantage that sulfur vulcanization systems and cross-linkers and optionally ZnO may be totally avoided, while the polymer latex compound to be used according to the present invention is still curable to provide dip-molded articles having the required tensile and self-healing properties to make them repairable and/or recyclable.

Method for Making Dip-Molded Articles:

In the method for making dip-molded latex articles according to the present invention, first, a clean mold having the desired shape of the final article is immersed in a coagulant bath comprising a solution of a metal salt. The coagulant is usually used as a solution in water, an alcohol or a mixture thereof. As specific examples of the coagulant the metal salts can be metal halides like calcium chloride, magnesium chloride, barium chloride, zinc chloride and aluminum chloride; metal nitrates such as calcium nitrate, barium nitrate and zinc nitrate; metal sulfates like calcium sulfate, magnesium sulfate, and aluminum sulfate; and acetic acid salts such as calcium acetate, barium acetate and zinc acetate. Most preferred are calcium chloride and calcium nitrate. The coagulant solution might contain additives to improve the wetting behavior of the former.

Thereafter, the mold is removed from the bath and optionally dried. The such treated mold is then immersed in the compounded latex composition according to the present invention. Thereby, a thin film of latex is coagulated on the surface of the mold. It is known in the art that the thickness of the thus dipped film may be influenced by the concentration of the compounded latex and/or the length of time that the salt-coated mold is in contact with the compounded latex. Alternatively, it is also possible to obtain the latex film by a plurality of dipping steps, particularly two dipping steps in sequence.

Thereafter, the mold is removed from the latex composition and optionally immersed in a water bath in order to extract, for example, polar components from the composition and to wash the coagulated latex film.

Thereafter, the latex coated mold is optionally dried at temperature below 80° C.

Finally, the latex coated mold is heat-treated at a temperature of 40-180° C. in order to obtain the desired mechanical properties for the final film product. Then, the final latex film is removed from the mold. The duration of the heat treatment will depend on the temperature and is typically between 1 and 60 minutes. The higher the temperature, the shorter is the required treatment time.

The inventors of the present invention surprisingly discovered that the dip-molding process can be run more economically when employing the polymer latex composition of the present invention. Particularly, it was discovered that the duration between forming the compounded latex composition according to the present invention and performing the dip-molding step (maturation time) can be considerably reduced to 180 min or less, compared to compounds made from standard latices that need a maturing time of well above 180 min.

Additionally, the inventors found that the temperature in the heat treatment step can be considerably reduced to be within a range of 40° C. to less than 120° C. without compromising the mechanical properties of the final dip-molded product. Conventional latices require temperature of 120° C. and above to achieve the desired mechanical properties. Thus, when employing the polymer latex of the present invention, the dip-molding process is less time-consuming and less energy-consuming, making it more economical.

According to the present invention, it is therefore preferred that in the compounding step (a) the polymer latex composition according to the present invention is compounded by adjusting the pH to a range of 10.5 to 13, preferably 11 to 12, without adding ZnO; or; and the thereby obtained compounded latex composition being free of sulfur vulcanization agents and sulfur vulcanization accelerators and ZnO is matured for less than 180 min, preferably 10 min to 150 min, more preferred 20 min to 120 min, most preferred 30 min to 90 min prior to be employed in the immersing step d); and/or in heat treating step h) the latex-coated mold is heat-treated at a temperature of 40° C. to less than 120° C., preferably 60° C. to 100° C., more preferred 70° C. to 90° C.

The elastomeric film made from the aqueous polymer latex composition or the compounded latex composition of the present invention exhibits after film formation and drying and optionally heat treating a heterogenous phase system having at least two distinct phases wherein a first phase is formed from the latex particles (I) and a second phase is formed from the cross-linking component (II) by reaction of multiple functional groups (c) on different molecules of cross-linking component (II) with each other and the first and the second phase are linked to each other by the thermally reversible linkage as defined above. The phase formed by the latex polymer (I) preferably forms the continuous phase having the phase formed from the cross-linking component (II) dispersed therein. Due to the low gel content of the latex polymer (I) the phase formed by the latex polymer (I) is rather soft and flexible whereas the phase formed from the cross-linking component (II) is harder compared the phase formed by the latex polymer (II).

Without wanting to be bound by theory the present inventors believe that the presence of a continuous soft phase in combination with a dispersed hard phase contributes to the desired mechanical properties of the elastomeric film, whereas the thermally reversible linkages between both phases provides for the self-healing properties of the elastomeric film that allow for the possibility that the elastomeric film of the present invention can be recycled and repaired.

The final heat-treated elastomeric film may have a tensile strength of at least about 7 MPa and an elongation at break of at least about 300%, preferably a tensile strength of at least about 10 MPa, an elongation at break of at least about 350%, more preferred a tensile strength of at least about 15 MPa and an elongation at break of at least about 400% and even more preferred a tensile strength of at least about 20 MPa and an elongation at break of at least about 500%. These mechanical properties were measured according ISO37-77 (5th Edition 2011-12-150).

The dip-molding process of the present invention can be used for any latex article that can be produced by a dip-molding process known in the art.

The article may be selected from health care devices formed from elastomeric films or including elastomeric films, surgical gloves, examination gloves, condoms, catheters or all different kinds of industrial and household gloves.

Method for Repairing an Elastomeric Film or Article Comprising said Elastomeric Film Items formed from an elastomeric film are collected and sorted and optionally sterilized for handling purposes. The items where there is damage, but not to the extent that they cannot be re-used, are separated and the surface where there is damage is optionally further cleaned. This cleansing may be by washing with hydrogen peroxide or other sterilizing fluid or by passing under a carbon dioxide air stream or UV light to make sure there are no pathogens present. In the location of damage, the surfaces of the damaged film that have separated from one another are brought together such that they contact one another, for example if there is a hole the edges of the hole are brought into contact and the surface is heated so that the elastomeric film can soften and the surfaces seal together to repair the damage after which the surface is allowed to cool and reveal a repaired or self-healed surface. The heating may be carried out where pressure is applied to the contacting areas of the damaged surface.

Method for Recycling an Elastomeric Film or Article Comprising said Elastomeric Film Elastomeric materials such as gloves are collected and if necessary, they are sorted so that the nitrile containing materials are collected together while the other material is discarded or sent to alternative recycling or reprocessing facilities. The collected material is then washed and decontaminated if necessary, much like is done for the repairing/self-healing process. The material is then comminuted into particle sizes of not more than 2 mm average diameter, preferably not more than 1 mm average diameter and ideally of diameters in the range of 0.15 to 0.75, more preferably 0.2 to 0.3 average diameter of the particle size. The comminution or grinding process may be carried out at less than room temperature or indeed under cryogenic conditions to enable facile processing and to keep the material as particles before processing further. The cool conditions avoid any re-joining of the particles until needed. The material may be stored at room temperature, or under such conditions that avoid rejoining of the particles until required. The material may be ground further before being fed to a blender where the material is blended with other materials for example particles of virgin elastomeric material and customary processing aids and additives. If there is no blending step, the material is fed directly to a thermal processing system where the particles/crumb is hot pressed, 2-roll milled, calendered or extruded under pressure and at heated conditions i.e. more than 40 degrees centigrade to allow fluidity in the material until the glass transition temperature is reached for the material and at this stage the material can also be molded into the required final shape. After this the material is cooled, optionally in molds or as part of an extrusion process to produce an end product that is formed from recycled material.

The present invention will be further illustrated with reference to the following examples.

Determination of Physical Parameters:

The dispersions were characterized by determination of total solids content (TSC), pH value, gel content, viscosity (Brookfield LVT) and z-average particle size. Furthermore, the final films were tested for tensile properties.

Determination of Gel Content:

A sample of the latex under test was sieved through white filter cloth to remove any skin or coagulum. A thin film of latex was then casted onto a glass plate and spread using a spreader until a film thickness of approximately 0.1~0.3 mm was achieved.

The glass plate was placed in the air-circulating oven at temperature of 55~60° C. for 2 hours. After drying, the polymer was removed from the plate and cut into small pieces. Approximately 1 gram of the dry polymer was weighed into a 175 ml glass jar and the polymer weight was recorded down. 100 ml (±1 ml) of the MEK (methyl ethyl ketone) and a magnetic stirrer bar were then added. The jar was sealed with a lid and placed on the magnetic stirrer in the water bath, which was set to 35° C. Agitation was carried out for 16 hours. After that, the sample was removed from the water bath and allowed to cool to ambient temperature. A shallow foil cup was accurately weighed. The jar was left aside for a while to separate the solvent and un-dissolved polymer. 15 ml of the solution was filtered through a filter paper into a clear glass container before 5 mL of this solution was transferred to the shallow foil cup using a pipette. The cup was placed under IR lamp (115~120° C.) in a fume cupboard, for 30 minutes. Finally, the cup was removed from the IR lamp and cooled to room temperature before reweighed.

Calculation of Gel Content:
 Weight of Dry Sample=A
 Weight of Shallow Foil Cup=B
 Weight of Shallow Foil Cup+Dried Contents=C $$\% \text{ TSC of Solvent } (W/V) = \frac{(C-B)}{5} \times 100 = D$$

Total Weight of Dissolved Polymer (in 100 ml)=100×D/100=E

% Gel Content=(1−E/A)×100

Determination of Total Solid Contents (TSC):

The determination of total solids content is based on a gravimetric method. 1-2 g of the dispersion was weighed into a tared aluminum dish, on an Analytical balance. The dish was stored for 1 hour at 120° C. in a circulating air oven until constant mass was reached. After cooling to room temperature, the final weight was then re-determined. The solids content was calculated as follows:

$$TSC = \frac{m_{initial} - m_{final}}{m_{initial}} 100\% \quad (1)$$

where, $m_{initial}$=initial mass of latex,
 $m_{final}$=mass after drying

Determination of pH Value:

The pH value was determined according to DIN ISO 976. After applying a 2-point calibration using buffer solutions, the electrode of a Schott CG 840 pH meter was immersed in the dispersion at 23° C. and the constant value on the display was recorded as the pH value.

Determination of Viscosity:

The latex viscosity was determined at 23° C. using a Brookfield LVT viscometer. Approximately 220 ml of the liquid (freed of air bubbles) was filled into a 250 ml beaker and the spindle of the viscometer was immersed up to the mark on the spindle. The viscometer was then switched-on and after approximately 1 minute the value was recorded until it was constant. The viscosity range determines the choice of spindle and rotational speed and the factor for the recorded value to calculate the viscosity. The information regarding spindle and revolutions per minute used are shown in parenthesis in Examples 1, 2 & 8.

Determination of the Particle Size (PS):

The z-average particle size was measured using a Malvern Zetasizer Nano S (ZEN 1600) using dynamic light scattering. The latex sample was diluted with deionized water to the turbidity level described in the manual and transferred in the test cuvette. The cuvette was gently mixed to make the sample homogenous and the cuvette was placed in the measurement device. The value was recorded as software generated z-average particle size.

Cast Film Preparation:

A glass plate was cleaned by firstly washing it with detergent, followed by deionised water before drying in an air-circulating oven set at 65-70° C. A suitably cleaned dam arrangement was then placed on to the glass slide and an aliquot of the desired compounded latex was then carefully poured into the dam to prevent entrainment of any air bubbles, and at a quantity which is sufficient to produce a film of approximately 1 mm thickness upon drying. The latex was initially allowed to dry at room temperature and humidity for 3 days. The film was then carefully removed from the glass plate and annealed in a circulating air oven set at 90° C. for 24 hours to ensure complete drying and to promote crosslink formation.

Dipped Film Preparation:

Nitrile latex with, or without compounding materials at the desired pH value was stirred for 3 hours at room temperature, and then coagulant dipped as follows. A ceramic spade was washed with soap and then thoroughly rinsed with deionized water before drying in an air-circulating oven set at 65-70° C. (spade temperature, 55-60° C.) until dry. A solution of coagulant was prepared by dissolving calcium nitrate (18% wt.) and calcium carbonate (2% wt.) in deionized water. The dry spade was then dipped into the salt solution, removed and then dried in an air-circulating oven set at 70-75° C. (spade temperature, 60-65° C.) until dry. The salt-coated spade was then dipped into the desired, compounded latex (which has total solid content of 18 wt % and matured for 24 hours at room temperature after compounding) for a dwell time of 5 seconds, before removing it and placing the latex-coated spade into an air circulating oven, set at 100° C. for 1 minute, to gel the film.

The thus gelled film was then washed in a tank of deionized water set to 50-60° C. for 1 minute, before curing in an air-circulating oven set to 120° C. for 20 minutes; after which, the thus cured/vulcanized film was cooled, and removed from the spade before aging for 22 hours in an air-circulating oven set to 100° C. Finally, the cured gloves were manually stripped from the spade, a typical dried film thickness was 0.056-0.066 mm. The gloves prepared from the latexes were tested for their tensile strength properties, and stress relaxation behavior.

Determination of the Tensile Strength Properties on Crosslinked (Vulcanized) Elastomer Samples:

The tensile properties of the crosslinked (vulcanized) or recycled elastomer films were tested in accordance with ISO37-77 (5th Edition 2011-12-15), the dumbbell specimens were cut from gloves prepared from each latex compound using a Type ISO37-2 cutter (width of narrow portion=4 mm, length of narrow portion=25 mm, overall length=75 mm, the thicknesses of the dumbbells are stated in the results Tables) and tested on a Hounsfield HK10KS Tensiometer fitted with H500LC extensometer, at an extension rate of 500 mm/min.

Preparation of Recycled Crosslinked Elastomer Films:

The samples for the tensile test were prepared by re-combining cut-up samples of the dipped film produced from the original compounded latex, the mixture of small pieces was placed between two polished steel plates before hot pressing at 13.8 MPa (2000 psi) for the number of minutes stated in each Example (typically 5 minutes), and at the temperature stated in each Example (typically 100, 120, 150 or 180° C.), before being cooled to room temperature and then dumbbell shaped samples cut out using the cutter specified in ISO37-77 (5th edition, 2011-12-15), Type ISO37-2 die cutter).

Determination of Stress Relaxation Properties

The stress relaxation properties of the elastomer films were performed on dumbbell specimens cut from the gloves prepared from each latex compound using a ASTM D412 Type C cutter (width of narrow portion=6 mm, length of narrow portion=33 mm, overall length=115 mm, the thicknesses of the dumbbells are stated in the results Tables). The tests were performed on a DMA Q800 Dynamic Mechanical Analyser supplied by TA Instruments, which was operated in the "stress relaxation mode", that is in the tension mode; in which the sample was strained to a value of 1% and the initial stress value recorded ($G_0$). Subsequent stress values were then recorded as a function of time that the sample was held at 1% strain ($G_t$).

The following abbreviations are used in the Examples:
BA=n-butyl acrylate
MAA=methacrylic acid
Bd=1,3-butadiene (butadiene)
ACN=acrylonitrile
GMA=glycidyl methacrylate
tDDM=tert-dodecyl mercaptan
Na$_4$EDTA=tetra sodium salt of ethylenediaminetetraacetic acid
tBHP=tertiary butyl hydroperoxide
TSC=total solid content
PS=particle size
ZnO=zinc oxide
ZDEC=zinc diethyldithiocarbamate In the following all parts and percentages are based on weight unless otherwise specified.

EXAMPLES

Example 1: Preparation of Carboxylated Nitrile Latex 2 parts by weight (based on polymer solids) of an oxirane-free seed latex (average particle size 36 nm) and 80 parts by weight of water (based on 100 parts by weight of monomer including the seed latex) were added to a nitrogen-purged autoclave and subsequently heated to 30° C. Then 0.01 parts by weight of Na$_4$EDTA and 0.005 parts by weight of Bruggolite® FF6 dissolved in 2 parts by weight of water were added, followed by 0.08 parts by weight of sodium persulfate dissolved in 2 parts by weight of water. Then, the monomers (35 parts by weight of acrylonitrile, 58 parts by weight of butadiene, 5 parts by weight of methacrylic acid), and were added together with 0.6 parts by weight of tDDM over a period of 4 hours. Over a period of 10 hours 2.2 parts by weight of sodium dodecyl benzene sulfonate, 0.2 parts by weight of tetra sodium pyrophosphate and 22 parts by weight of water were added. The co-activator feed of 0.13 parts by weight of Bruggolite® FF6 in 8 parts by weight of water was added over 9 hours. The temperature was maintained at 30° C. up to a conversion of 95%, resulting in a total solids content of 45%. The polymerization was short-stopped by addition of 0.08 parts by weight of a 5% aqueous solution of diethylhydroxylamine. The pH was adjusted using potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex, and the pH was adjusted to 8.2 by addition of a 5% aqueous solution of potassium hydroxide.

The following characterization results were obtained for Example 1:
TSC=44.9 wt. %
pH=8.2
Viscosity=38 mPas (1/60)
Particle size, $P_z$=121 nm
Gel content=0%

Example 2 (Comparative)

A portion of the XNBR latex, Example 1, was adjusted to a pH value of 11.5 using an aqueous solution of potassium hydroxide, and then compounded with 1 phr zinc oxide, 0.8 phr of sulphur and 0.7 phr of ZDEC. The compound was then stirred for 3 hours and then cast on to a glass plate as described above.

A dried and cured film obtained from Example 2 was then cut into several dumbbell samples using a Type ISO37-2 cutter. One dumbbell remained uncut whilst another was cut into halves using a sharp blade applied to the narrow section of the dumbbell. The cut dumbbell was then immediately re-joined by holding the cut surfaces together and manually pressed together for 60 seconds, this was immediately followed by the application of the jaws of a wooden clothes peg to maintain the intimate contact of the 2 surfaces as the thus joined dumbbell was annealed in an air-circulating oven, maintained at 180° C., for 30 minutes.

The uncut and the repaired dumbbell was then subjected to a tensile test in order to determine the extent of recovery of the tensile properties using a Hounsfield HK10KS Tensiometer fitted with H500LC extensometer, at an extension rate of 500 mm/min. in accordance with ISO37-77. The resultant data is shown in Table 1.

Example 3

To an aliquot of Example 1 was added 1 phr of gamma-glycidoxypropyltrimethoxysilane, supplied by Momentive Performance materials Inc., and the pH adjusted to 11.5; the compound was then stirred for 3 hours and then cast on to a clean glass plate and allowed to dry at room temperature (25° C.) for 3 days. The thus obtained film was removed from the glass plate and annealed in an oven at 90° C. for 24 hours to ensure complete drying and to promote crosslink formation.

The tensile testing of uncut and repaired dumbbells of the thus dried film was performed in accordance with the method given in Example 2, and the result is reported in Table 1.

TABLE 1

| | Ex. 2 (comparative) | Ex. 3 |
|---|---|---|
| Example 1 | 100 | 100 |
| Compounding conditions | With ZnO, S and ZDEC, | No ZnO, S or ZDEC, |
| gamma-glycidoxypropyltrimethoxysilane (phr) | 0 | 1 |
| pH | 11.5 | 11.5 |
| A: Original tensile strength (MPa) | 5.3 | 6 |
| B: Tensile strength after repairing (MPa) | 2.3 | 8.6 |
| C: Original elongation at break (%) | 575 | 680 |
| D: Elongation at break after repairing (%) | 357 | 459 |
| Retention of tensile strength (B/A %) | 43 | 143 |
| Retention of elongation at break (D/C %) | 62 | 68 |
| Original Modulus (MPa) | | |
| 100% strain | 1.1 | 1.2 |
| 300% strain | 1.8 | 1.8 |
| 500% strain | 3.4 | 3.0 |
| Modulus after repairing (MPa) | | |
| 100% strain | 1.4 | 2.3 |
| 300% strain | 2.3 | 4.3 |
| 500% strain | R | R |

R ruptured before 500% strain

Example 4 (Comparative)

A portion of the XNBR latex, Example 1, was adjusted to a pH value of 10 using an aqueous solution of potassium hydroxide, and compounded with 1 phr zinc oxide, 1 phr titanium dioxide, 0.8 phr of sulphur and 0.7 phr of ZDEC. The compound was then adjusted to a concentration of 18% wt. solids and stirred for 3 hours. A film was prepared by the dipped film preparation method as described above.

The dried and cured film was then cut into a number of dumbbell shaped samples (25±0.8 mm in length, 6 mm in width, and 0.056-0.066 mm thick) using a pre-shaped cutter. The dumbbell was then clamped into the jaws of the DMA Q800 Dynamic Mechanical Analyser supplied by TA Instruments, and the sample allowed to equilibrate at the required test temperature for 5 minutes before being strained to 1%, and the initial stress value was recorded as $G_0$. Maintaining the strain at 1%, the stress value was then monitored as a function of time at the required test temperature ($G_t$), for 1200 seconds.

The test temperatures chosen were 100, 120, 150 & 180° C.

The stress relaxation was defined as follows,

Stress relaxation=$G_t/G_0$

The results obtained for Example 4 are shown in FIG. 1, it should be noted that a reference line has been drawn at a value of $G_t/G_0 = 1/e$ (=0.37).

The time elapsed for the stress to reach a value of 1/e is tabulated in Table 2. It should be noted that the stress relaxation values ($G_t/G_0$) for 120 and 100° C., did not fall below the 1/e reference line within the time period specified.

Example 5

Figure 2:
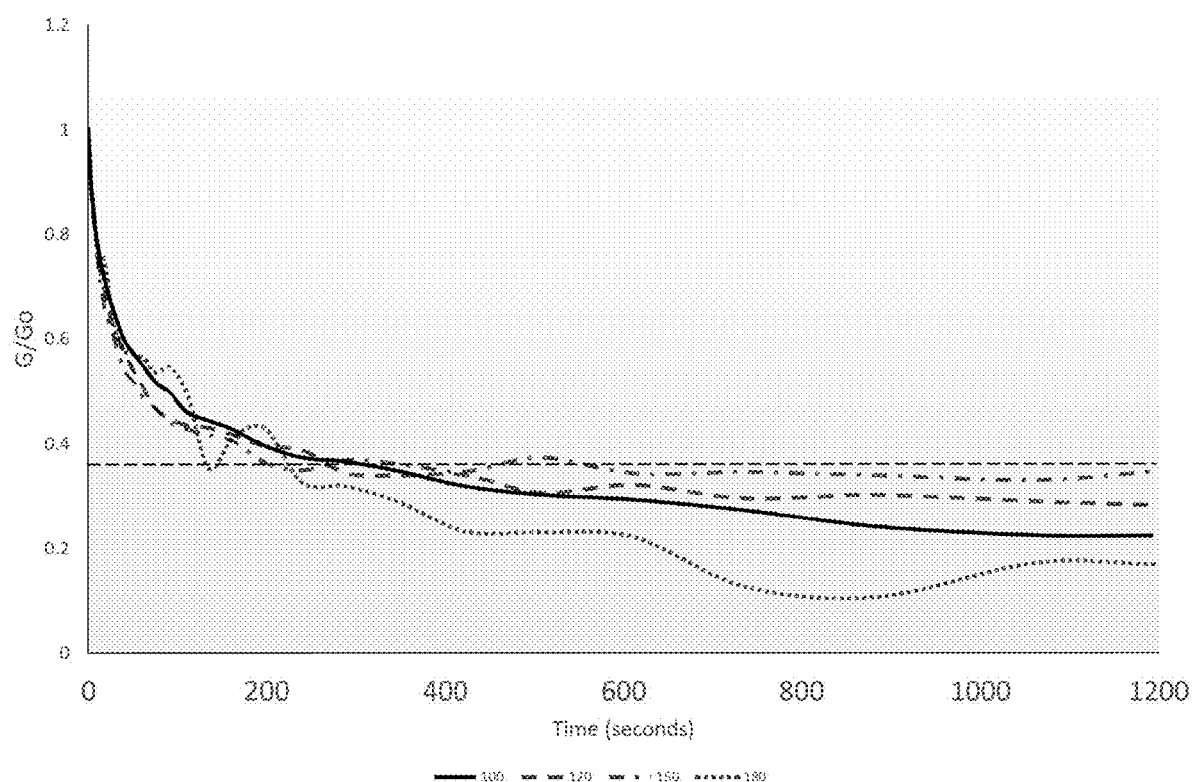
FIG. 2 illustrates the stress relaxation results of Example 5.

To an aliquot of Example 1 was added sufficient of an aliquot of (3-glycidyloxypropyl) triethoxy silane (GPTES) such that the GPTES was present at a level of 0.7 phr with respect to the solids content of Example 1. The latex was adjusted to a pH value of 10 using a solution of potassium hydroxide and compounded with 1 phr zinc oxide, the thus compounded blend stirred for 3 hours before it was dipped with a dry, salt-coated spade and processed and tested in accordance with the protocol given in Example 4. The result for the stress relaxation experiments is given in FIG. 2, and Table 2.

Example 6

Figure 3:
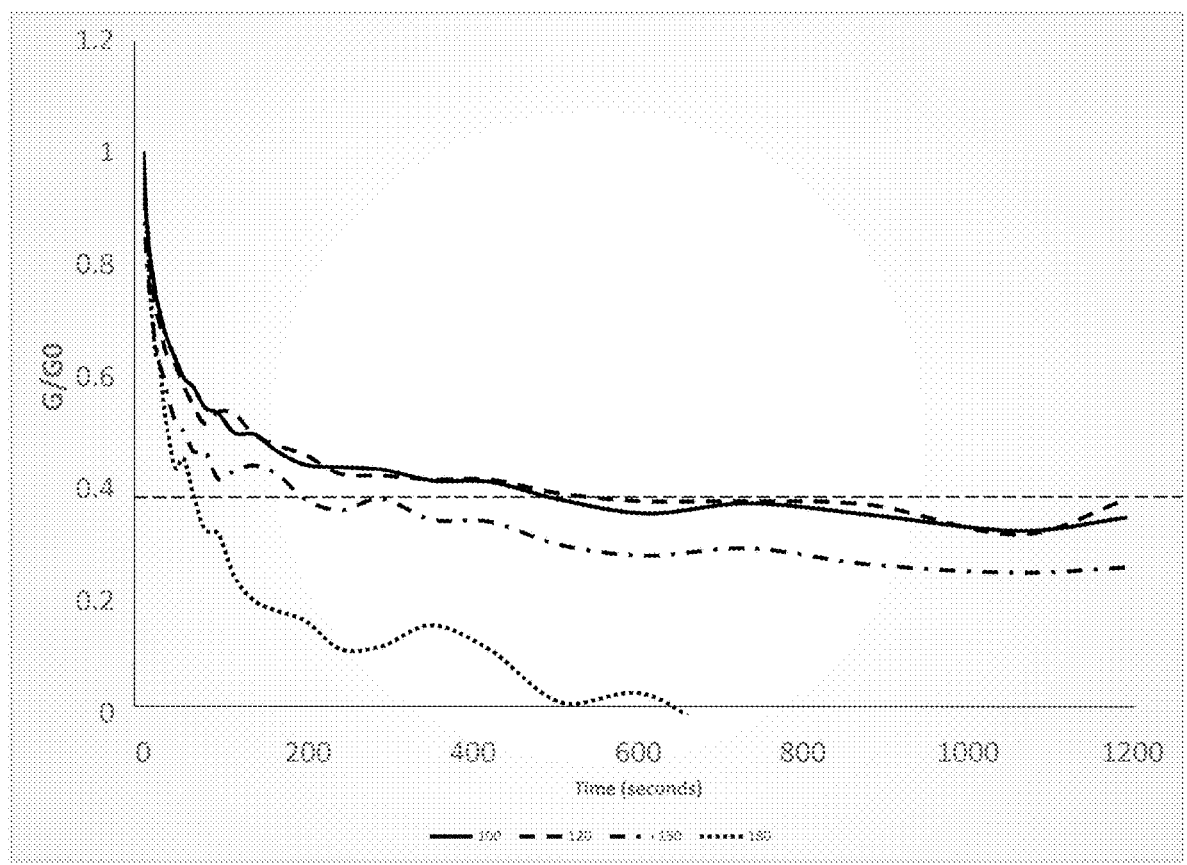
FIG. 3 illustrates the stress relaxation results of Example 6.

To an aliquot of Example 1 was added sufficient of an aliquot of 3-glycidyloxypropyl) triethoxy silane (GPTES) such that the GPTES was present at a level of 0.7 phr with respect to the solids content of Example 1. The latex was adjusted to a pH value of 11.5 using a solution of potassium hydroxide and the thus compounded blend stirred for 3 hours before it was dipped with a dry, salt-coated spade and processed and tested in accordance with the protocol given in Example 4. The result for the stress relaxation experiments is given in FIG. 3, and Table 2.

Example 7

0.050 parts by weight of Na$_4$EDTA dissolved in 0.95 parts by weight of water was added to a nitrogen-purged autoclave and subsequently heated to 45° C. Then 0.42 parts by weight of sodium dodecyl benzene sulfonate dissolved in 1.26 parts of water and 0.20 parts by weight of tetra potassium pyrophosphate dissolved in 94.73 parts of water were added. Then, the monomers (4 parts by weight of acrylonitrile, 5 parts by weight of butadiene, 0.5 part by weight of methacrylic acid) were added. Activation was carried out by adding 0.05 parts by weight of tBHP in 2.617 parts of water and 0.05 parts of sodium formaldehyde sulfoxylate in 2.617 parts of water. Over a period of 5.5 hours 63.5 parts by weight of butadiene, 21.5 parts by weight of acrylonitrile and 0.75 parts by weight of tDDM were added. Over a period of 4.5 hours 5.5 parts by weight of methacrylic acid was added. The activator feed of 0.16 parts by weight of tBHP in 1.973 parts by weight of water and co-activator feed of 0.11 parts by weight of sodium formaldehyde sulfoxylate in 1.357 parts by weight of water were added over 7 hours. The temperature was maintained at 45° C. up to 5 hours and ramped up to 60° C. until a conversion of 95% was achieved, resulting in a total solids content of 45%. The polymerization was short-stopped by addition of 0.2 parts by weight of a 5% aqueous solution of diethylhydroxylamine. The pH was adjusted using potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex, and the pH was adjusted to 8.3 by addition of a 5% aqueous solution of potassium hydroxide.

The following characterization results were obtained:
TSC=44.9 wt. %
pH=8.3
Viscosity=40 mPas (1/60)
Particle size, $P_z$=128 nm
Gel content=44%

Figure 4:
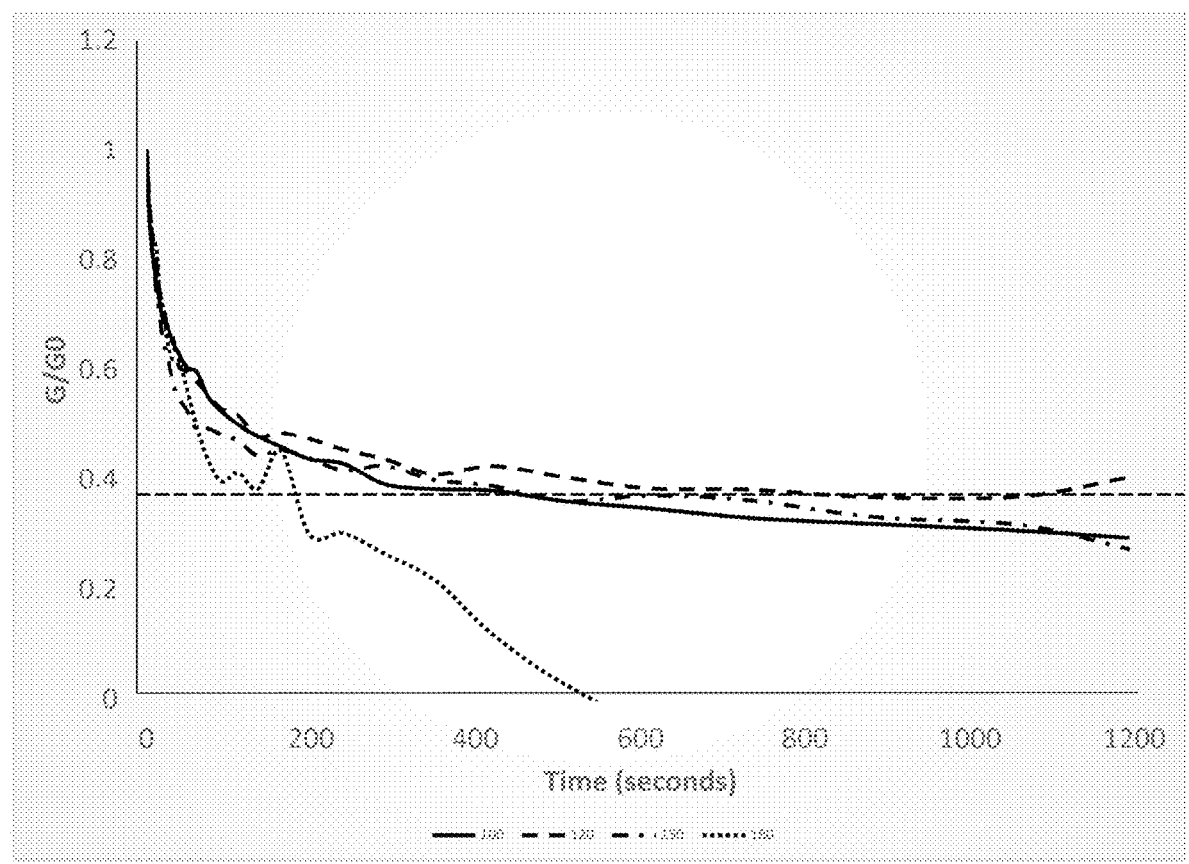
FIG. 4 illustrates the stress relaxation results of Example 7.

To an aliquot of the latex obtained above was added sufficient of an aliquot of 3-glycidyloxypropyl) triethoxy silane (GPTES) such that the GPTES was present at a level of 0.7 phr with respect to the solids content of the latex. The latex was adjusted to a pH value of 10 using a solution of potassium hydroxide and compounded with 1 phr zinc oxide, the thus compounded blend stirred for 3 hours before it was dipped with a dry, salt-coated spade and processed and tested in accordance with the protocol given in Example 4. The result for the stress relaxation experiments is given in FIG. 4, and Table 2.

Example 8

Figure 5:
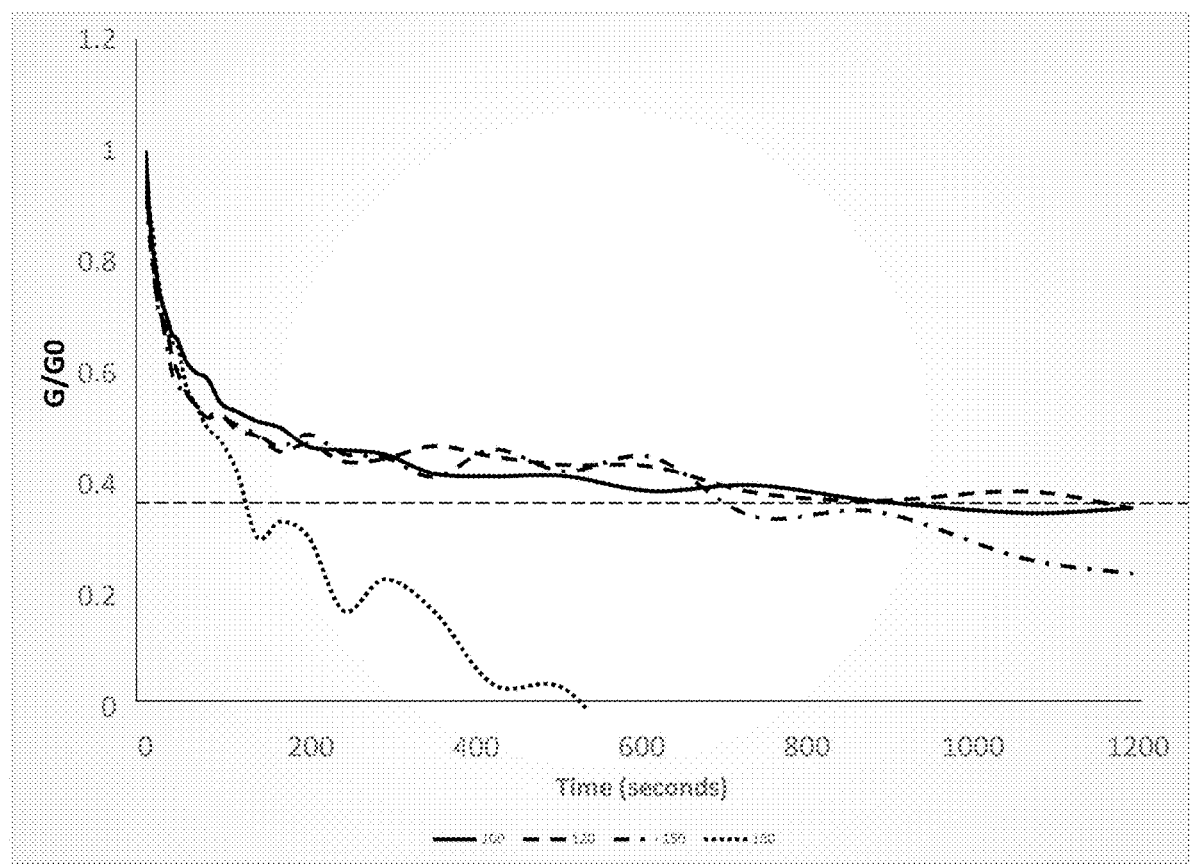
FIG. 5 illustrates the stress relaxation results of Example 8.

Example 7 was repeated with the exception that the latex was adjusted to a pH value of 11.5 using a solution of potassium hydroxide and no zinc oxide was added. The result for the stress relaxation experiments is given in FIG. 5, and Table 2.

TABLE 2

Stress relaxation data for the dipped films

| Compounded latex | Time to $G_t/G_0$ = 1/e (s) @ 180° C. | Time to $G_t/G_0$ = 1/e (s) @ 150° C. | Time to $G_t/G_0$ = 1/e (s) @ 120° C. | Time to $G_t/G_0$ = 1/e (s) @ 100° C. |
|---|---|---|---|---|
| Example 4 (comparative) | 220 | 883 | N/A | N/A |
| Example 5 | 135 | 200 | 240 | 290 |
| Example 6 | 65 | 200 | 612 | 510 |
| Example 7 | 180 | 507 | 883 | 507 |
| Example 8 | 120 | 700 | 883 | 883 |

This data is indicative for the re-processability of an elastomeric film made in accordance with the present invention. It is believed that this data can be interpreted such that in the inventive examples compared to the comparative example the cross-links break up and the polymer system then can move on the microscopic scale to relax the applied stress. This effect is more pronounced at higher temperatures. The elastomeric film made without ZnO shows this effect also at lower temperatures. This result is evidence for the self-healing properties of the elastomeric film described herein.

Recycling of the Crosslinked Elastomeric Films:

The samples for the tensile test were prepared by re-combining cut-up samples of the dipped film produced according to comparative example 4 and examples 5 and 6, the mixture of small pieces was annealed between two polished steel plates before hot pressing at 13.8 MPa (2000 psi) for 1 minute and 100° C., before being cooled to room temperature and then dumbbell shaped samples were cut out using the Type 2 die cutter specified in ISO37 (5th edition, 2011-12-15. The ends of the dumbbell were placed in the jaws of the Hounsfield HK10KS Tensiometer fitted with an H500LC extensometer and subjected to strain rate of 500 mm per minute. The value for the stress was reported automatically by the machine software, as was the modulus value at a given strain (typically 100, 300 and 500% strain). The result is reported in Table 3.

TABLE 3

Tensile data for recycled films

| | | | | ISO37-77 | | |
|---|---|---|---|---|---|---|
| | | Tensile | Elongation | Modulus | | |
| | Thickness | Strength | at break | (MPa) | | |
| Example | (mm) | (MPa) | (%) | 100 | 300 | 500 |
| 4 (comp) | 1.06 | 1.8 | 168 | 1.5 | R | R |
| 5 | 0.774 | 3.9 | 329 | 1.6 | 3.6 | R |
| 6 | 0.461 | 5.2 | 323 | 2.0 | 4.8 | R |

R ruptured before the indicated strain.

The invention claimed is:

1. An aqueous polymer latex composition for the preparation of an elastomeric film comprising:

(I) particles of a latex polymer obtained by free-radical emulsion polymerization of a mixture of ethylenically unsaturated monomers' the particles bearing functional groups (a), wherein the latex polymer has an average gel content of less than 70 wt %; and (II) a cross-linking component selected from monomeric compounds or oligomeric or polymeric compounds that are not prepared by free-radical addition polymerization, the cross-linking component comprising functional groups (b) and (c) that are different from each other, wherein functional group (b) forms upon reaction with functional group (a) a thermally reversible linkage selected from one or more of (i) a linkage having the structural formula

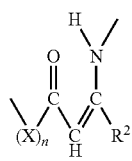

wherein
X is —O— or —NR$^1$—,
n is 0 or 1,
R$^1$ is hydrogen or a hydrocarbyl group, and
R$^2$ is a hydrocarbyl group; and
(ii) a beta-hydroxy ester linkage;
wherein functional groups (c) on different molecules of component (II) are capable of reacting with each other.

2. The aqueous polymer latex composition of claim 1, wherein the mixture of ethylenically unsaturated monomers comprises:
a) 15 to 99 wt % of conjugated dienes;
b) 1 to 80 wt % of ethylenically unsaturated nitrile compounds;
c) 0.05 to 10 wt % of ethylenically unsaturated compounds bearing functional groups (a);
d) 0 to 50 wt. % of vinyl aromatic monomers; and
e) 0 to 65 wt. % of co-polymerizable ethylenically unsaturated compounds,
wherein monomers a) to e) are different from each other and the weight percentages being based on the total monomers in the mixture.

3. The aqueous polymer latex composition of claim 2, wherein
a) the conjugated dienes are selected from butadiene, isoprene, 2,3-dimethyl-1,3-butadiene, 2-ethyl-1,3-butadiene, 1,3-pentadiene, myrcene, ocimene, farnasene or combinations thereof,
b) the ethylenically unsaturated nitrile compounds are selected from (meth) acrylonitrile, alpha-cyanoethyl acrylonitrile, fumaronitrile, alpha-chloronitrile or combinations thereof;
c) the ethylenically unsaturated compounds bearing functional group (a) are selected from
ethylenically unsaturated compounds bearing a functional group having the structure:

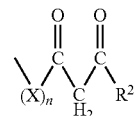

wherein X, n, R$^1$ and R$^2$ are as defined;
ethylenically unsaturated compounds having a primary amino group;
ethylenically unsaturated oxirane compounds;
ethylenically unsaturated carboxylic acids and salts thereof;
ethylenically unsaturated polycarboxylic acid anhydride;
polycarboxylic acid partial ester monomers and salts thereof; and
d) the vinyl aromatic monomers are selected from styrene, alpha-methyl styrene, vinyl toluene or combinations thereof;
e) the co-polymerizable ethylenically unsaturated compounds are selected from
e1) alkyl esters of ethylenically unsaturated acids;
e2) hydroxyalkyl esters of ethylenically unsaturated acids;
e3) amides of ethylenically unsaturated acids;
e4 vinyl carboxylates; or
e5) alkoxyalkyl esters of ethylenically unsaturated acids; and the functional group (b) is selected from an oxirane group, a carboxylic acid group, salt or anhydride thereof, a primary amine group or a functional group having the structure:

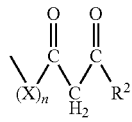

wherein X, n, R$^1$ and R$^2$ are as defined.

4. The aqueous polymer latex composition of claim 1, wherein the mixture of ethylenically unsaturated monomers for latex polymer (I) comprises:
 a) 20 to 99 wt % of conjugated dienes;
 b) 1 to 60 wt % of monomers selected from ethylenically unsaturated nitrile compounds;
 c) 0.05 to 7 wt % of ethylenically unsaturated acids;
 d) 0 to 40 wt % of vinyl aromatic monomers;
 e1) 0 to 25 wt % of $C_1$ to $C_8$ alkyl (meth) acrylates;
 e3) 0 to 10 wt % of ethylenically unsaturated compounds bearing amide groups; and
 e4) 0 to 10 wt. % wt % of vinyl esters,
 the weight percentages being based on total monomers in the mixture.

5. The aqueous polymer latex composition of claim 1, wherein the functional group (a) is a carboxylic acid group, a salt or anhydride thereof and functional group (b) is an oxirane group.

6. The aqueous polymer latex composition of claim 1, wherein the particles of a latex polymer (I) and the cross-linking component (II) are present in relative amounts to provide a molar ratio of functional groups (b) to functional group (a) from 0.1 to 2.

7. The aqueous polymer latex composition of claim 1, wherein latex particles exhibit a gradient of a concentration of the functional group (a) with a higher concentration of functional groups (a) at a surface of the particles and a lower concentration within a bulk of the particles.

8. The aqueous polymer latex composition of claim 1, wherein the functional group (c) is selected from silane groups bearing a plurality of silicon bonded hydroxyl groups and/or hydrolysable groups.

9. The aqueous polymer latex composition of claim 1, wherein the crosslinking component (II) is selected from
 oxirane functional di- or tri alkoxysilanes; or
 primary amino functional di- or tri alkoxysilanes.

10. The aqueous polymer latex composition of claim 1, wherein the particles of a latex polymer (I) have a gel content of less than 60 wt %.

11. A compounded latex composition suitable for production of dip-molded articles, comprising the aqueous polymer latex composition according to claim 1 and optionally adjuvants selected from sulfur vulcanization agents, accelerators for sulfur vulcanization, crosslinkers, polyvalent cations or combinations thereof.

12. The compounded latex composition of claim 11, wherein the compounded latex composition is free of sulfur vulcanization agents and accelerators for sulfur vulcanization and/or ZnO.

13. The compounded latex composition of claim 11, wherein the compounded latex composition has a pH of 10.5 to 13.

14. A method for making a dip-molded article, the method comprising:
 a) providing a compounded latex composition of claim 11;
 b) immersing a mold having a desired shape of a final article in a coagulant bath comprising a solution of a metal salt;
 c) removing the mold from the coagulant bath and optionally drying the mold;
 d) immersing the mold as treated in step b) and c) in the compounded latex composition of step a);
 e) coagulating a latex film on a surface of the mold to produce a latex-coated mold;
 f) removing the latex-coated mold from the compounded latex composition and optionally immersing the latex-coated mold in a water bath;
 g) optionally drying the latex-coated mold;
 h) heat treating the latex-coated mold obtained from step e) or f) at a temperature of 40° C. to 180° C. to produce a dip-molded article; and
 i) removing the dip-molded article from the mold.

15. An elastomeric film made from the aqueous polymer latex composition according to claim 1, wherein the aqueous polymer latex composition exhibits heterogenous phase system having at least two distinct phases wherein a first phase is formed from the particles of a latex polymer (I) and a second phase is formed from the cross-linking component (II) by reaction of multiple functional groups (c) on different molecules of cross-linking component (II) with each other and the first and the second phase are linked to each other by the thermally reversible linkage as defined.

16. The elastomeric film of claim 15, wherein the particles of a latex polymer (I) form a continuous phase having the phases formed from the cross-linking component (II) dispersed therein.

17. An article comprising the elastomeric film of claim 15, wherein the article is selected from surgical gloves, examination gloves, condoms, catheters, industrial gloves, textile-supported gloves or household gloves.

18. A method for repairing an elastomeric film according to claim 15, the method comprising:
 a) providing the elastomeric film that is damaged, the damaged elastomeric film having at least surfaces to be reconnected,
 b) re-joining the surfaces of the damaged elastomeric film, and
 c) heating or annealing the damaged elastomeric film while maintaining intimate contact of rejoined surfaces of the damaged elastomeric film at a temperature of 40° C. to 200° C.

19. A method for recycling an elastomeric film according to claim 15 comprising cutting, shredding or comminuting the elastomeric film to form particles of the elastomer, optionally blending the particles of elastomer with particles of virgin elastomer, and forming a recycled film by subjecting the particles to a pressure of 1-20 MPa and a temperature of 40° C. to 200° C.

* * * * *

UNITED STATES PATENT AND TRADEMARK OFFICE
CERTIFICATE OF CORRECTION

PATENT NO. : 12,378,344 B2
APPLICATION NO. : 17/633428
DATED : August 5, 2025
INVENTOR(S) : Peter Shaw, Zhenli Wei and Yi-Fan Goh Page 1 of 1

It is certified that error appears in the above-identified patent and that said Letters Patent is hereby corrected as shown below:

In the Claims

In Column 25, Line 44 of Claim 1: delete "monomers" and insert -- monomers, --.

In Column 26, Line 18 of Claim 2: delete "50 wt. %" and insert -- 50 wt % --.

In Column 26, Line 19 of Claim 2: delete "65 wt. %" and insert -- 65 wt % --.

In Column 26, Line 65 of Claim 3: delete "e4" and insert -- e4) --.

In Column 27, Line 25 of Claim 4: delete "10 wt. % wt %" and insert -- 10 wt % --.

Signed and Sealed this
Twenty-first Day of October, 2025

John A. Squires
*Director of the United States Patent and Trademark Office*